United States Patent [19]
Kondo et al.

[11] Patent Number: 5,080,185
[45] Date of Patent: Jan. 14, 1992

[54] REAR SUSPENSION SYSTEM FOR FOUR-WHEEL-STEERED VEHICLE

[75] Inventors: Toshiro Kondo; Kouji Tsuji; Takeshi Edahiro; Naoto Takata, all of Hiroshima, Japan

[73] Assignee: Mazda Motor Corporation, Hiroshima, Japan

[21] Appl. No.: 589,786

[22] Filed: Sep. 26, 1990

[30] Foreign Application Priority Data

Sep. 28, 1989 [JP] Japan .................................. 1-253850

[51] Int. Cl.⁵ .............................................. B62D 7/06
[52] U.S. Cl. .................................. 180/140; 180/141; 280/91; 280/701
[58] Field of Search ...................... 180/140, 141, 142; 280/91, 701, 96, 98, 99, 103

[56] References Cited

U.S. PATENT DOCUMENTS 4,610,455  9/1986  Furukawa et al. .................. 280/91

FOREIGN PATENT DOCUMENTS 2124167  2/1984  United Kingdom .

*Primary Examiner*—Charles A. Marmor
*Assistant Examiner*—Alan M. Kagen
*Attorney, Agent, or Firm*—Sixbey, Friedman, Leedom & Ferguson

[57] ABSTRACT

A rear suspension system for a four-wheel-steered vehicle has a wheel support which supports a rear wheel for rotation and is connected to a rear wheel turning rod of the rear wheel turning mechanism. A pair of suspension arms are connected to the wheel support and guide the wheel support so that the rear wheel on the wheel support is turned about a kingpin axis in response to displacement of the rear wheel turning rod member. One of the suspension arms includes a so-called I-shaped arm which is connected for rotation to the wheel support at one end and to the vehicle body at the other end, and the kingpin axis intersects the tread of the rear wheel at a point which is offset in the longitudinal direction of the vehicle body from the point at which a side force acts on the rear wheel during cornering. A damping system is connected between the I-shaped arm and the vehicle body. The I-shaped arm is positioned so that the counterforce of the damping system generates a moment which tends to turn the rear wheel in the direction opposite to the direction in which the moment generated by the side force acting on the rear wheel when the vehicle corners with the rear wheel being the outer wheel tends to turn the rear wheel.

16 Claims, 8 Drawing Sheets

REAR SUSPENSION SYSTEM FOR FOUR-WHEEL-STEERED VEHICLE

BACKGROUND OF THE INVENTION

1. Field of the Invention

This invention relates to a rear suspension system for a four-wheel-steered vehicle in which both the front and rear wheels are turned in response to operation of the steering wheel.

2. Description of the Prior Art

As disclosed, for instance, in UK Patent No. 2124167, there has been known a rear wheel turning mechanism for a four-wheel-steered vehicle in which the caster trail and the kingpin offset of the rear wheels are set negative in order to reduce the effort required to turn the rear wheels. That is, as shown in FIG. 11 which is a side view of right rear wheel 3R, when kingpin axis KP intersects the road surface at point O which is on the rear side of the center G of the tread of the right rear wheel 3R and caster trail l, which is the distance between the point O and the center G of the tread as measured in the longitudinal direction of the vehicle body, is negative, a restoring torque or a self alignment torque produced during cornering is reduced and the force required to turn the rear wheel 3R is reduced. Further, as shown in FIG. 12 which is a rear view of the rear wheel 3R, when the point O at which the kingpin axis KP intersects the road surface is on the outer side of the center G of the tread and the kingpin offset m, which is the distance between the point 0 and the center G of the tread as measured in the transverse direction of the vehicle body, is negative, the road surface resistance which acts when the rear wheel 3R is turned is reduced and the force required to turn the rear wheel 3R is reduced.

However, when the caster trail l and the kingpin offset m are both negative, a force A which tends to turn the rear wheel 3R in the direction of toe-in about the kingpin axis KP acts in response to a side force which acts on the right rear wheel 3R (the outer wheel) when the vehicle is turning to the left, since the kingpin axis KP is offset outward from the center G of the tread of the right rear wheel 3R as shown in FIG. 13 which is a plan view of the right rear wheel 3R. When a force which tends to turn the right rear wheel 3R acts in response to counterforce of a damping system such as of a shock absorber while said force A is acting, heavy load is applied to the rear wheel turning mechanism.

SUMMARY OF THE INVENTION

In view of the foregoing observations and description, the primary object of the present invention is to provide a rear suspension system for a four-wheel-steered vehicle which is simple in structure and in which a large force which tends to turn the outer wheel about a kingpin axis does not act during cornering of the vehicle and accordingly, the load input into the rear wheel turning mechanism is light.

In accordance with the present invention, there is provided a rear suspension system for a four-wheel-steered vehicle which is provided with a front wheel turning mechanism and a rear wheel turning mechanism and in which both front and rear wheels are turned in response to operation of a steering wheel, the rear suspension system comprising a wheel support which supports a rear wheel for rotation and is connected to a rear wheel turning rod member of the rear wheel turning mechanism so that the rear wheel on the wheel support is turned about a kingpin axis when the rear wheel turning rod member is displaced, a pair of suspension arms which are connected to the wheel support and guide the wheel support so that it defines the kingpin axis and the rear wheel on the wheel support is turned about the kingpin axis in response to displacement of the rear wheel turning rod member, at least one of the suspension arms including a so-called I-shaped arm which is connected for rotation to the wheel support at one end and to the vehicle body at the other end, and the kingpin axis intersecting the tread of the rear wheel at a point which is offset in the longitudinal direction of the vehicle body from the point at which a side force acts on the rear wheel during cornering, and a damping means which is connected between the I-shaped arm and the vehicle body and restrains vertical motion of the rear wheel, the damping means being arranged so that its counterforce acts on the wheel support by way of the I-shaped arm to push downward the rear wheel, the I-shaped arm being positioned so that the counterforce of the damping means which acts on the wheel support by way of the arm generates a moment which tends to turn the rear wheel in the direction opposite to the direction in which the moment generated by the side force acting on the rear wheel when the vehicle corners with the rear wheel being the outer wheel tends to turn the rear wheel.

In the rear suspension system in accordance with the present invention, the moment generated by the counterforce of the damping means and the moment generated by the side force during cornering of the vehicle cancel each other and accordingly, the load input into the rear wheel turning mechanism during cornering is minimized.

DESCRIPTION OF THE PREFERRED EMBODIMENT

Figure 1:
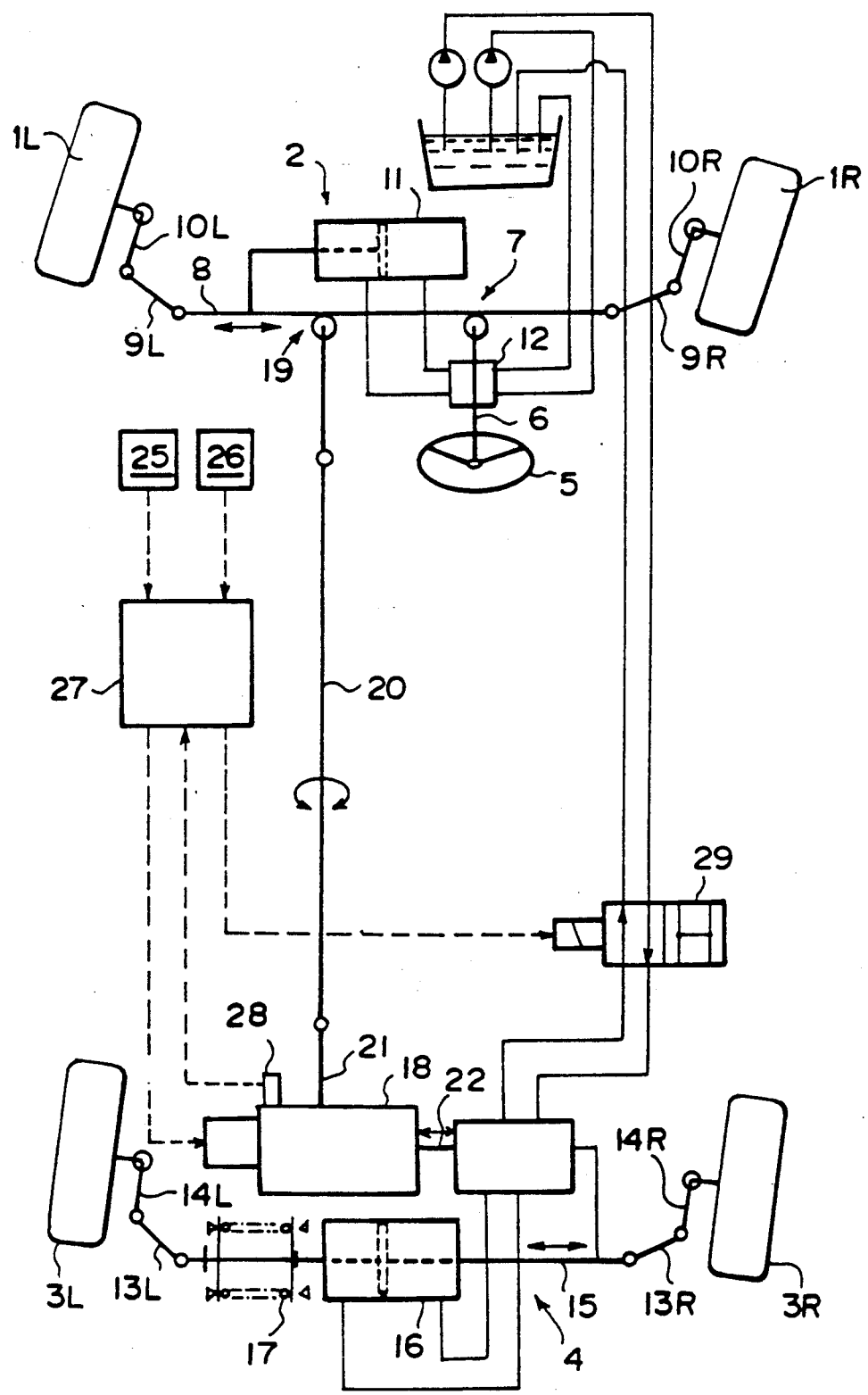
FIG. 1 is a schematic view of a four-wheel-steered vehicle in which the rear suspension system of the present invention is employed.

In FIG. 1, a four-wheel-steered vehicle has left and right front wheels 1L and 1R and left right rear wheels 3L and 3R. The left and right front wheels 1L and 1R are turned by a front wheel turning mechanism 2 which comprises a steering wheel 5, a steering shaft 6 rotated by the steering wheel 5, a front wheel turning rod 8, a rack and pinion mechanism 7 which converts rotation of the steering shaft 6 into linear motions of the front wheel turning rod 8 in the transverse direction of the vehicle body, and left and right knuckle arms 10L and 10R which are respectively connected to opposite ends of the front wheel turning rod 8 by way of tie rods 9L and 9R. Further, the front wheel turning mechanism 2 is provided with a power steering system which comprises a power cylinder 11 and a control valve 12 which switches the hydraulic line for feeding hydraulic pressure to the power cylinder 11 in response to operation of the steering wheel 5.

The left and right rear wheels 3L and 3R are turned by a rear wheel turning mechanism 4 which comprises a rear wheel turning rod 15, and left and right knuckle arms 14L and 14R which are respectively connected to opposite ends of the rear wheel turning rod 12 by way of tie rods 13L and 13R. The rear wheel turning mechanism 4 further comprises a power steering system which includes a power cylinder 16 through which the rear wheel turning rod 15 moves. A centering spring 17 urges the rear wheel turning rod 15 toward the neutral position where the rear wheels 3L and 3R are held in the straight-ahead position.

The rear wheel turning mechanism 4 is provided with a rear wheel steering ratio changing mechanism 18 which changes the rear wheel steering ratio (which is the ratio of the rear wheel turning angle to the front wheel turning angle) according to the vehicle speed.

Reference numeral 21 denotes an input shaft of the rear wheel steering ratio changing mechanism 18 and reference numeral 22 denotes a control rod which functions as an output shaft of the same. The motion of the front wheel turning rod 8 in the transverse direction of the vehicle body is converted into a rotation by a second rack and pinion mechanism 19 and is transmitted to the input shaft 21 of the rear wheel steering ratio changing mechanism 18. The control rod 22 is connected to a control valve 23 for the power cylinder 16 and the casing (not shown) of the control valve 23 is connected to the rear wheel turning rod 15, whereby the rear wheel turning rod 15 is driven according to predetermined rear wheel steering ratio characteristics.

Figure 2:
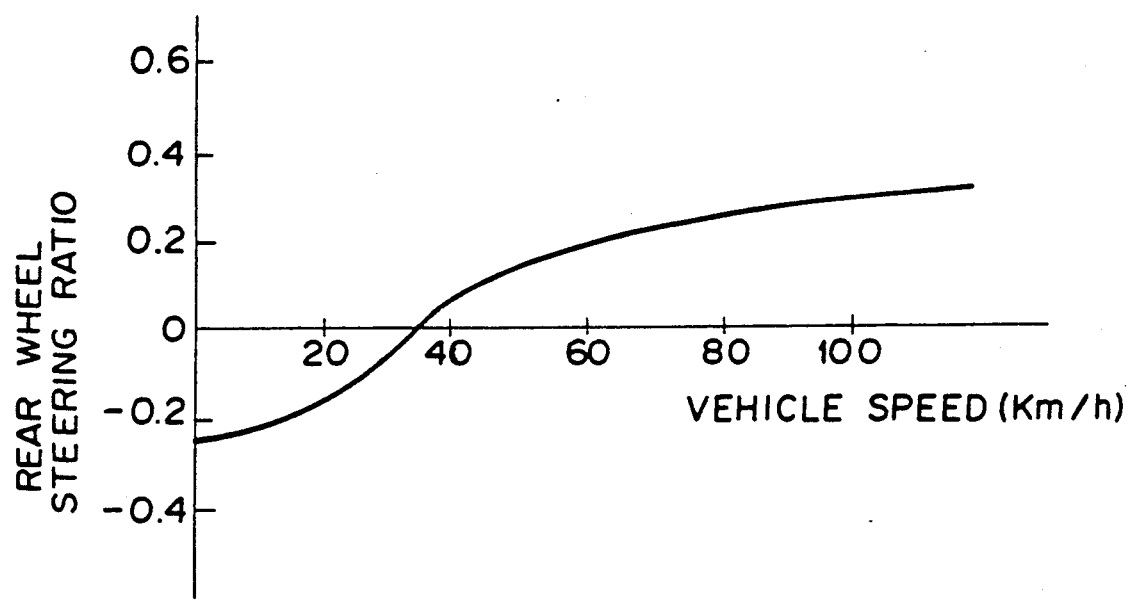
FIG. 2 is a graph for illustrating the relation between the vehicle speed and the rear wheel steering ratio.

That is, a control unit 27 controls the rear wheel steering ratio changing mechanism 18 according to the vehicle speed detected by vehicle speed sensors 25 and 26 so that the rear wheels 3L and 3R are turned in the same direction as the front wheels 1L and 1R (same phase) when the vehicle speed is higher than 35 Km/h, are kept in the neutral position irrespective of the turning angle of the front wheels in the vehicle speed range near 35 Km/h, and are turned in the direction opposite to the front wheels (reverse phase) when the vehicle speed is lower than 35 Km/h as shown in FIG. 2. In FIG. 2, the positive rear wheel steering ratio represents that the rear wheels are turned in the same direction as the front wheels, and the negative rear wheel steering ratio represents that the rear wheels are turned in the direction opposite to the front wheels. The operating condition of the rear wheel steering ratio changing mechanism 18 is detected by a steering ratio sensor 28 whose detecting signal is fed back to the control unit 27.

Hydraulic oil is fed to the control valve 23 from an oil pump by way of a solenoid valve 29. The solenoid valve 29 cuts the hydraulic oil to the control valve 23 under the control of the control circuit 27 when the control system fails, thereby releasing the hydraulic pressure in the power cylinder 16 so that the rear wheel turning rod 15 is returned to the neutral position under the force of the centering spring 17. That is, when the control system fails, the rear wheels are not turned even if the front wheels are turned and are returned to the straight-ahead position in the case where they have been turned from the straight-ahead position.

Figure 3:
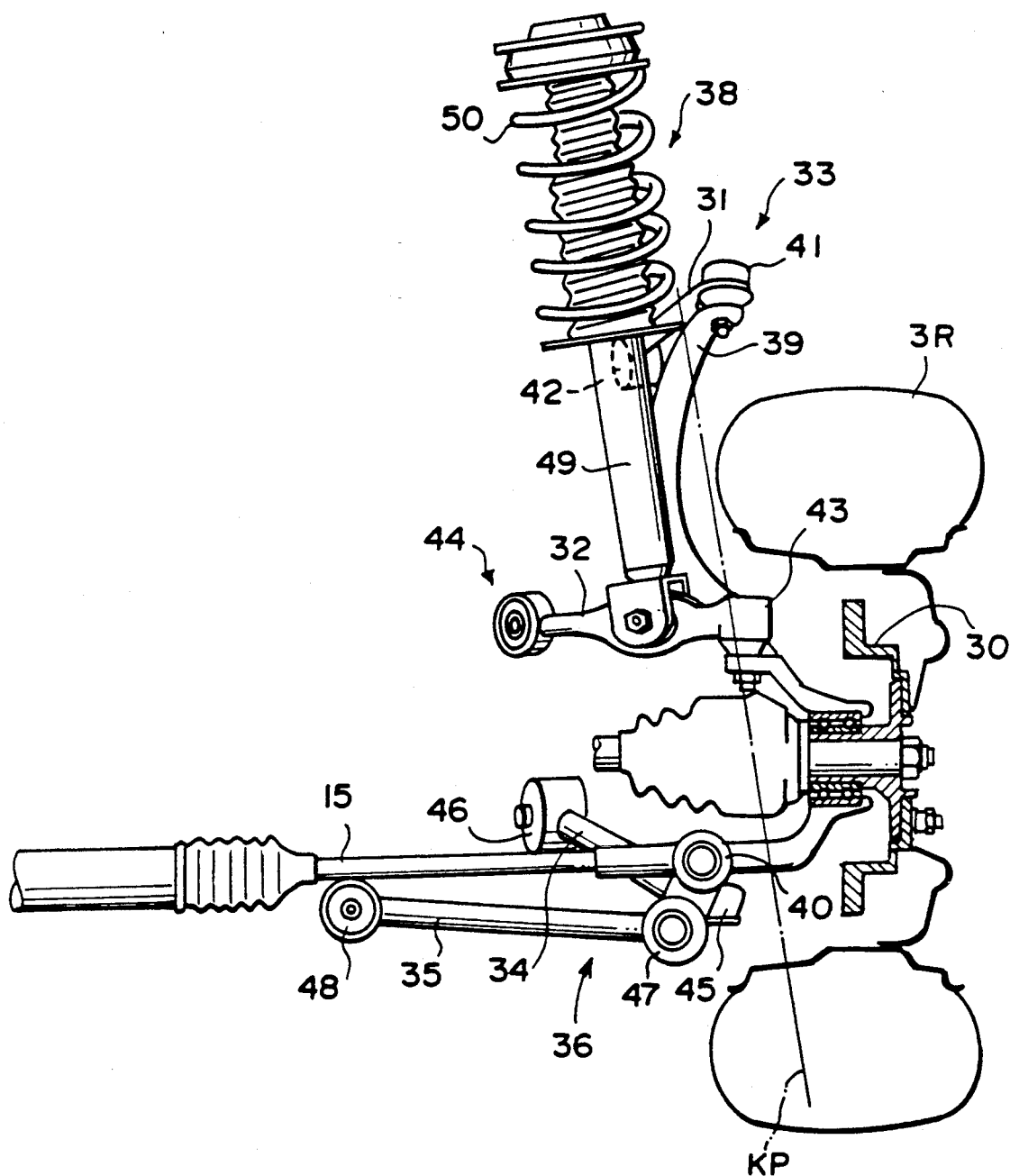
FIG. 3 is a rear view partly in cross-section of a rear suspension system in accordance with an embodiment of the present invention.
Figure 4:
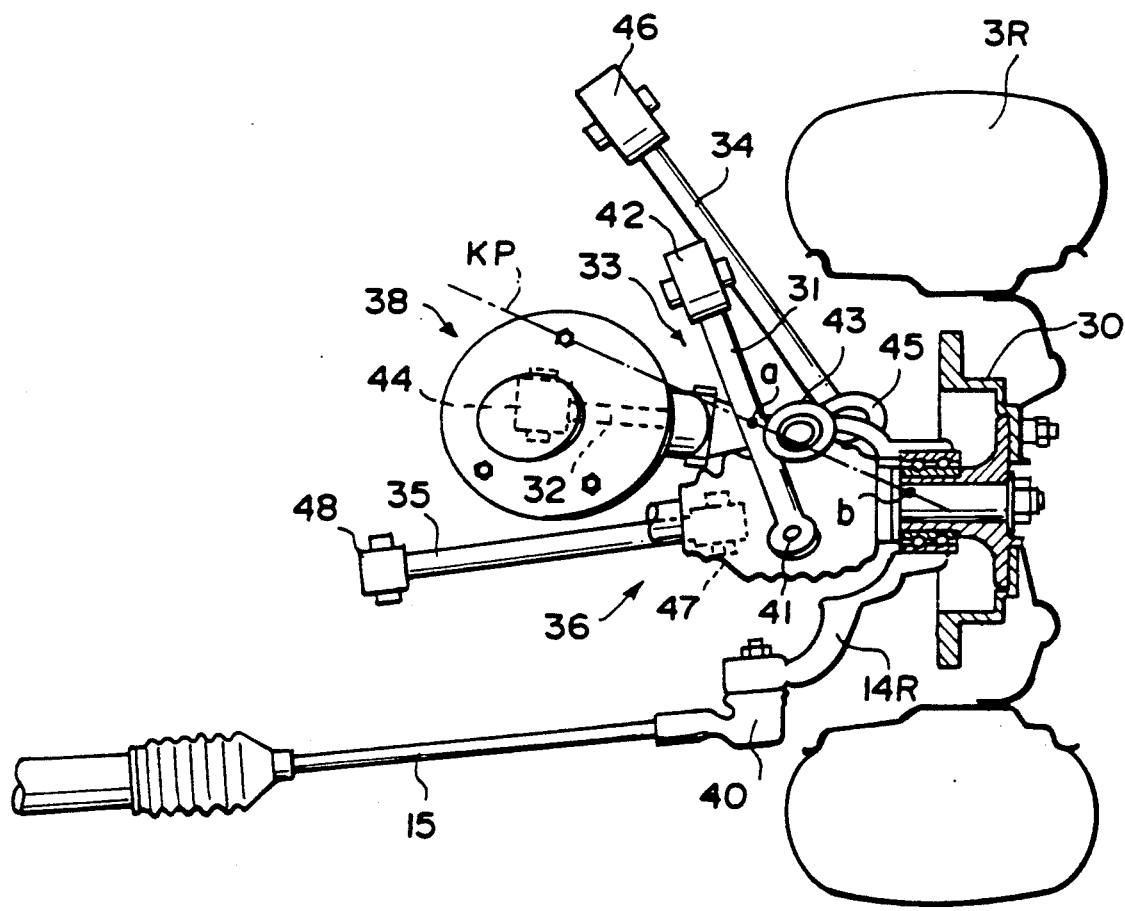
FIG. 4 is a plan view partly in cross-section of the rear suspension system shown in FIG. 3.

FIGS. 3 and 4 show a rear suspension system for supporting the right rear wheel 3R in accordance with an embodiment of the present invention. The rear suspension system comprises a wheel support 30 which supports the right rear wheel 3R for rotation, an upper arm 33, a lower arm 36 and a damping system 38 which suppresses vertical vibration of the vehicle body. The upper arm 33 comprises a first upper arm 31 and a second upper arm 32, and the lower arm 36 comprises a first lower arm 34 and a second lower arm 35.

The wheel support 30 has an extension 39 which extends upward above its rim portion along the inner surface of the right rear wheel 3R, and the knuckle arm 14R extends rearward from the lower end of the wheel support 30. The right end of the rear wheel turning rod 15 is connected to the knuckle arm 14R by way of a ball joint 40. The first upper arm 31 extends in the longitudinal direction of the vehicle body, and its rear end is connected to the extension 39 of the wheel support 30 by way of a ball joint 41. The front end of the first upper arm 31 is connected for rotation to the vehicle body by way of a resilient bushing 42. The second upper arm 32 extends in the transverse direction of the vehicle body below the first upper arm 31. The outer end of the second upper arm 32 is connected to the front end portion of the wheel support 30 by way of a ball joint 43, and the inner end of the second upper arm 32 is connected for rotation to the vehicle body by way of a resilient bushing 44.

The first lower arm 34 of the lower arm 36 extends in the longitudinal direction of the vehicle body. The rear end of the first lower arm 34 is connected to the lower end portion of the wheel support 30 by way of a ball joint 45, and the front end of the first lower arm 34 is connected for rotation to the vehicle body by way of a resilient bushing 46. The second lower arm 35 extends in the transverse direction of the vehicle body on the rear side of the first lower arm 34. The outer end of the second lower arm 35 connected to the lower end portion of the wheel support 30 by way of a ball joint 47, and the inner end of the second lower arm 35 is connected for rotation to the vehicle body by way of a resilient bushing 48. The line joining the point a at which the first and second upper arms 31 and 32 intersect each other as viewed from above and the point b at which the longitudinal axes of the first and second lower arms 34 and 35 intersect each other as viewed from above defines a kingpin axis KP, and the right rear wheel 3R is turned about the kingpin axis KP in response to turning of the steering wheel 5.

The damping system 38 comprises a shock absorber 49 which extends upward on the inner side of the first upper arm 34 and a coil spring 50 which is provided around the upper portion of the shock absorber 49. The shock absorber 49 is connected to the second upper arm 32 at the lower end and to the vehicle body at the upper end.

Figure 5:
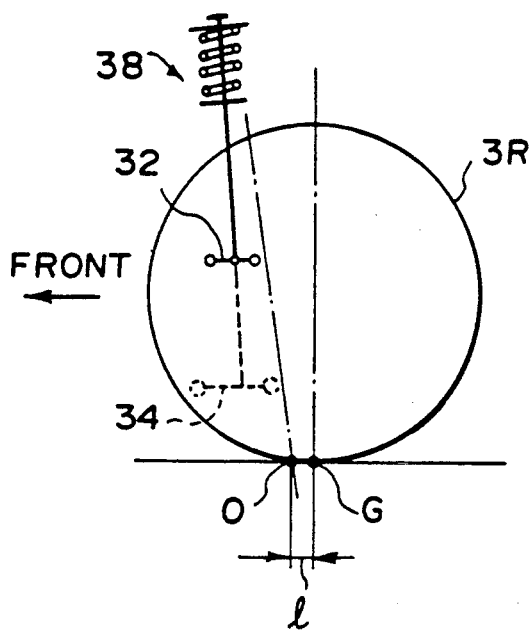
FIG. 5 is a schematic side view for illustrating disposition of the kingpin axis and the damping system.
Figure 6:
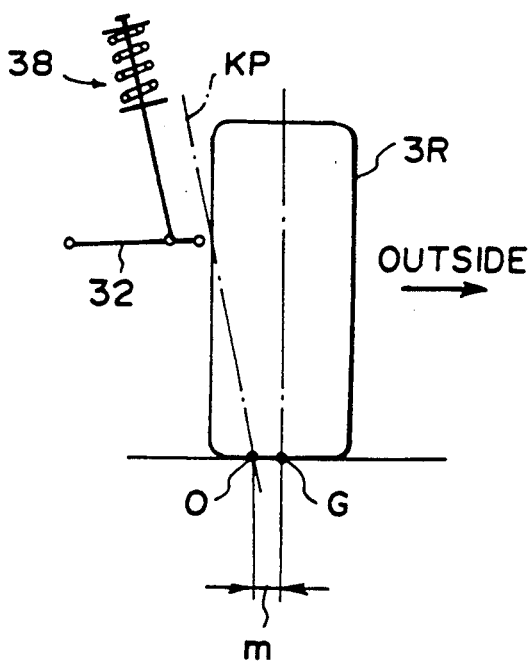
FIG. 6 is a schematic rear view for illustrating disposition of the kingpin axis and the damping system.
Figure 7:
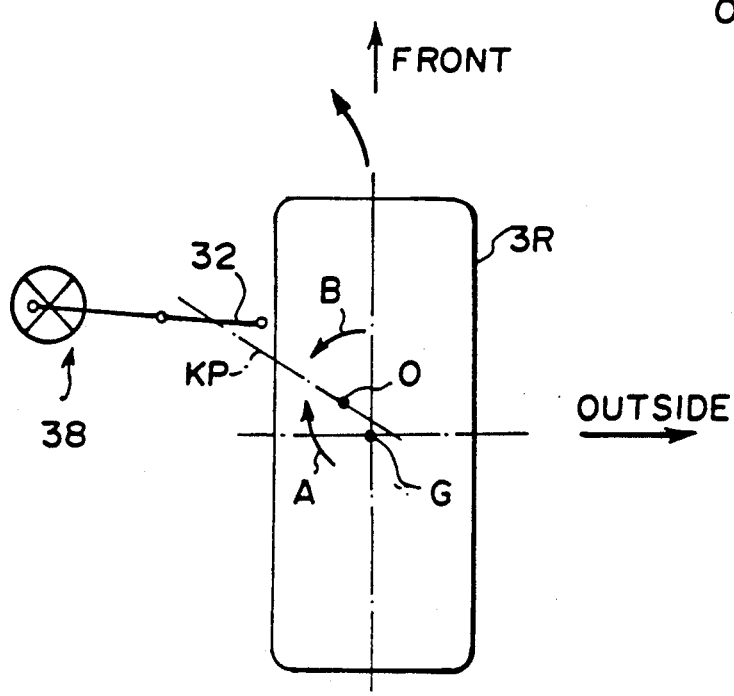
FIG. 7 is a schematic plan view for illustrating the operation of the rear suspension system shown in FIG. 3, FIGS. 8 to 10 are views respectively similar to FIGS. 5 to 7 but for illustrating another embodiment of the present invention.

The kingpin axis KP tilts forward at the top as viewed from side as shown in FIG. 5 and intersects the road surface at a point O which is in front of the center G of the tread of the right rear wheel 3R, whereby the caster trail l is set positive. Further, the kingpin axis KP tilts inward at the top as viewed from rear as shown in FIG. 6 and the point O at which the kingpin axis KP intersects the road surface is on the inner side of the center G of the tread of the right rear wheel 3R, whereby the kingpin axis offset is set positive. Accordingly, as shown in FIG. 5 which shows the kingpin axis KP as viewed from above, when a side force acts on the right rear wheel 3R (the outer wheel) during a left cornering, a force A which tends to turn the right rear wheel 3R in the direction of toe-out about the kingpin axis KP acts on the right rear wheel 3R in response to the side force.

The second upper arm 32 which supports the lower end of the damping system 38 is connected to the wheel support 30 at a position in front of the kingpin axis KP. When a counterforce of the coil spring 50 of the damping system 38 acts downward in response to a lifting force input into the damping system 38 from the right rear wheel 3R during cornering, a force which pushes inwardly downwardly the outer end of the second upper arm 32, i.e., the lower end of the wheel support 30 according to the counterforce, is produced and a force B which tends to turn the right rear wheel 3R in the direction of toe-in about the kingpin axis KP acts on the right rear wheel 3R.

The forces A and B cancels each other, and accordingly, the load input into the rear wheel turning mechanism 4 during cornering is kept light, whereby the operating condition of the rear wheel turning mechanism 4 is stabilized. Further, the centering spring 17 which returns the rear wheels 3L and 3R to the neutral position in case the rear wheel turning mechanism 4 fails may have an urging force which just overcomes the load corresponding to the difference between the forces A and B and accordingly, the spring force of the centering spring 17 may be weaker than in the conventional systems and the load on the hydraulic system which drives the rear wheel turning rod 15 overcoming the force of the centering spring 17 is reduced.

When the lower end of the damping system 38 is supported by the second upper arm 32 as in the embodiment described above, the degree of freedom of positioning the damping system 38 increases as compared when it is directly connected to the wheel support 30, and the damping system 38 can be disposed in a desired position without interfering with the arms of the suspension. Further since the damping system 38 can be substantially vertical between the second upper arm 32 and the vehicle body, the direction of action of the damping system 38 can conform to the direction of vertical vibration of the vehicle body, whereby damping effect of the damping system 38 is improved.

Figure 8:
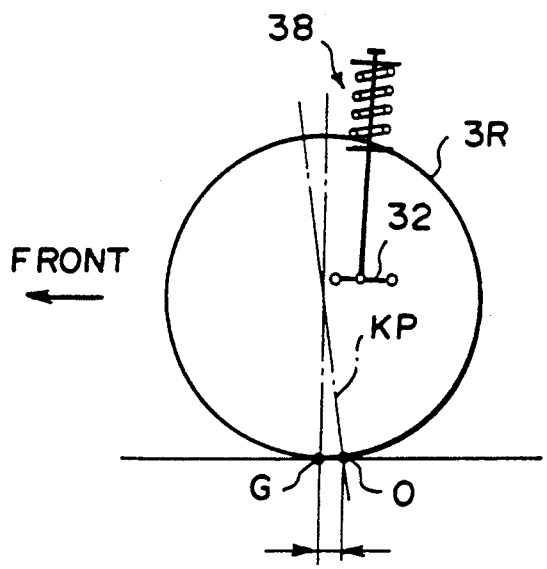
Figure 9:
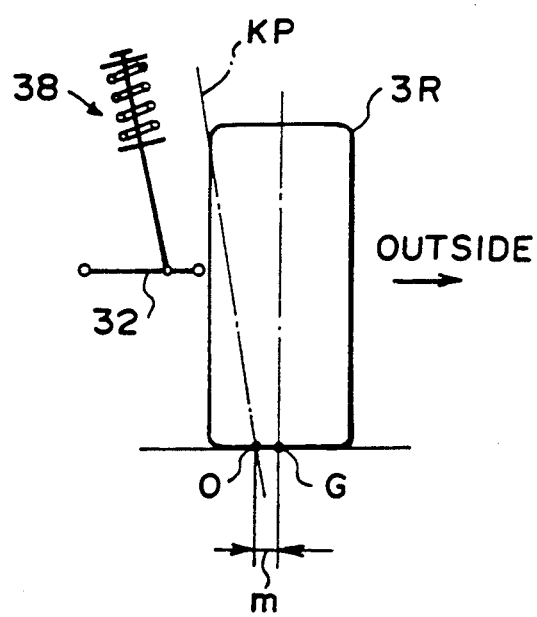
Figure 10:
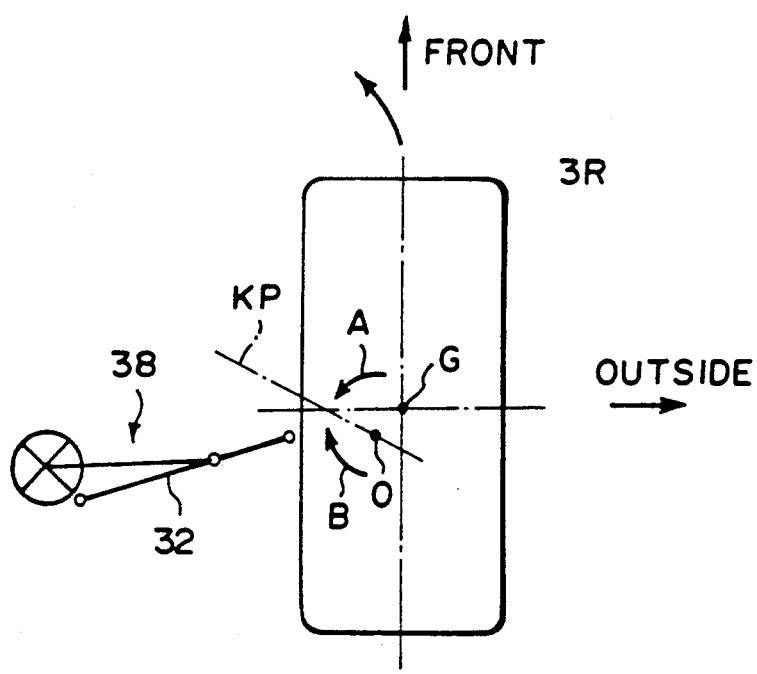
Figure 11:
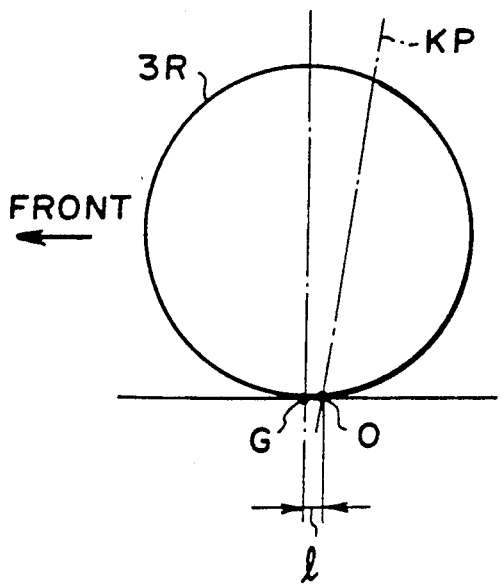
FIGS. 11 to 13 are views respectively similar to FIGS. 5 to 7 but for illustrating a rear suspension system in accordance with a prior art.
Figure 12:
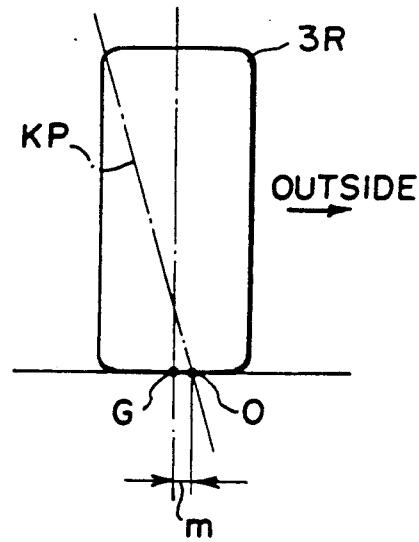
Figure 13:
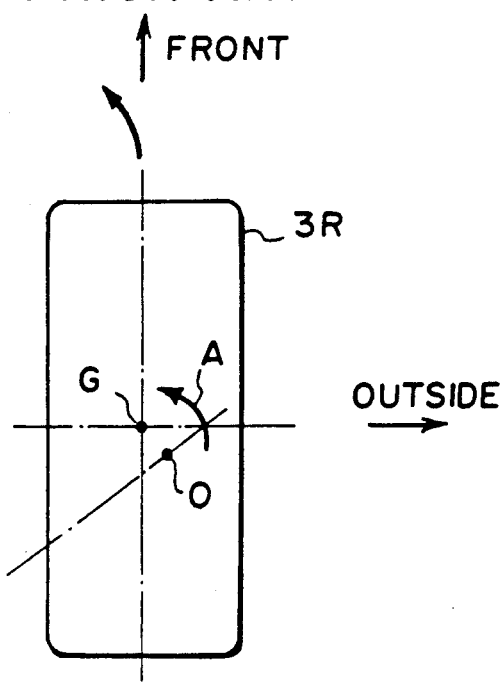

The position of the kingpin axis KP need not be limited to that in the embodiment described above. For example, the kingpin axis KP may tilt rearward and inward at the top as shown in FIGS. 8 and 9 to intersect the road surface at a point 0 which is in the rear and on the inner side of the center G of the tread of the right rear wheel 3R, whereby the caster trail l is set negative and the kingpin axis offset is set positive. When the kingpin axis KP is positioned in this manner, a force A which tends to turn the right rear wheel 3R in the direction of toe-in about the kingpin axis KP acts on the right rear wheel 3R when a side force acts on the right rear wheel 3R (the outer wheel) during a left cornering as shown in FIG. 10. In this case, the second upper arm 32 is connected to the wheel support 30 in the rear of the kingpin axis KP so that a force B which tends to turn the right rear wheel 3R in the direction of toe-out about the kingpin axis KP acts on the right rear wheel 3R under the counterforce of the damping system 38.

Further, the lower end of the damping system 38 may be supported on an arm other than the second upper arm 32. For example, the lower end of the damping system 38 may be supported on the first lower arm 34 as shown by the broken line in FIG. 5.

Figure 14A:
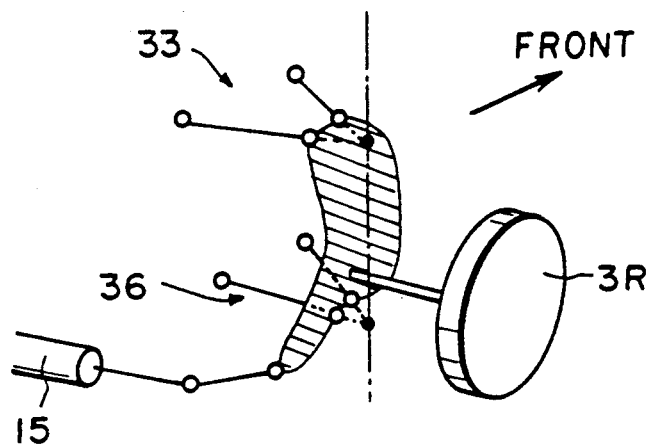
FIGS. 14a, 14b and 14c are views for illustrating various rear suspension systems to which the present invention can be applied.
Figure 14B:
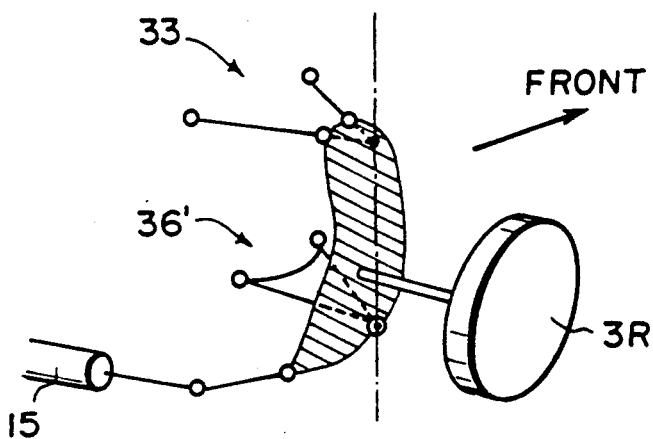
Figure 14C:
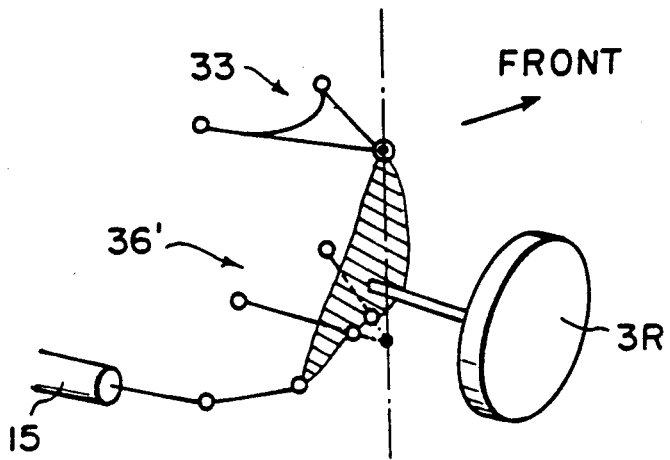

In the embodiment described above, the present invention is applied to a rear suspension system comprising upper and lower arms 33 and 36 each formed of a pair of so-called I-shaped arms which are separately pivoted on the wheel support and the vehicle body at their opposite ends as shown in FIG. 14a. However, the present invention can be applied to the rear suspension systems shown in FIGS. 14b and 14c. The suspension system shown in FIG. 14b comprises an upper arm 33 formed of a pair of so-called I-shaped arms which are separately pivoted on the wheel support and the vehicle body at their opposite ends and a lower arm 36' formed of a single arm member (so-called A-shaped arm) which is pivoted on the wheel support at one end and the other end portion of which is bifurcated into two ends each of which is pivoted on the vehicle body. In the suspension system shown in FIG. 14b, the damping system is connected to one of the I-shaped arms of the upper arm 33. The suspension system shown in FIG. 14c comprises a lower arm 36 formed of a pair of so-called I-shaped arms which are separately pivoted on the wheel support and the vehicle body at their opposite ends and an upper arm 33' formed of a single arm member (so-called A-shaped arm) which is pivoted on the wheel support at one end and the other end portion of which is bifurcated into two ends each of which is pivoted on the vehicle body. In the suspension system shown in FIG. 14c, the damping system is connected to one of the I-shaped arms of the lower arm 36.

We claim:

1. A rear suspension system for a four-wheel-steered vehicle which is provided with a front wheel turning mechanism and a rear wheel turning mechanism and in which both front and rear wheels are turned in response to operation of a steering wheel, the rear suspension system comprising:

a wheel support which supports a rear wheel for rotation and is connected to a rear wheel turning rod member of the rear wheel turning mechanism so that the rear wheel on the wheel support is turned about a kingpin axis when the rear wheel turning rod member is displaced, a pair of suspension arms which are connected to the wheel support and guide the wheel support so that it defines the kingpin axis and the rear wheel on the wheel support is turned about the kingpin axis in response to displacement of the rear wheel turning rod member, at least one of the suspension arms comprising a first arm which is connected to the wheel support at one end and to the vehicle body at the other end, and the kingpin axis intersecting the tread of the rear wheel at a point which is offset in the longitudinal direction of the vehicle body from the point at which a side force acts on the rear wheel during cornering, and a damping means which is connected between the first arm and the vehicle body and restrains vertical motion of the rear wheel, the damping means for generating a counterforce which urges the wheel support downward relative to the vehicle body by way of the first arm, the first arm being positioned so that the counterforce of the damping means, which acts on the wheel support b y way of the first ram, generates a moment which tends to turn the rear wheel in the direction opposite to the direction in which the moment, generated by the side force acting on the rear wheel when the vehicle corners with the rear wheel being the outer wheel, tends to turn the rear wheel.

2. A rear suspension system as defined in claim 1 in which the point at which the kingpin axis intersects the tread of the rear wheel is forwardly offset from the point at which a side force acts on the rear wheel during cornering, the kingpin axis tilts inward of the vehicle body at the top, and said first arm is connected to the wheel support in front of the kingpin axis.

3. A rear suspension system as defined in claim 2 in which said damping means comprises a spring member which is compressed between the first arm and the vehicle body.

4. A rear suspension system as defined in claim 3 in which said spring member comprises a coil spring.

5. A rear suspension system as defined in claim 2 in which said first arm forms together with a second arm a lower suspension arm which is disposed below the center of the rear wheel.

6. A rear suspension system as defined in claim 1 in which the point at which the kingpin axis intersects the tread of the rear wheel is rearwardly offset from the point at which a side force acts on the rear wheel during cornering, the kingpin axis tilts inward of the vehicle body at the top, and said first arm is connected to the wheel support on the rear of the kingpin axis.

7. A rear suspension system as defined in claim 6 in which said damping means comprises a spring member which is compressed between the first arm and the vehicle body.

8. A rear suspension system as defined in claim 7 in which said spring member comprises a coil spring.

9. A rear suspension system as defined in claim 6 in which said first arm forms together with a second arm a lower suspension arm which is disposed below the center of the rear wheel.

10. A rear suspension system for a four-wheel-steered vehicle which is provided with a front wheel turning mechanism and a rear wheel turning mechanism and in which both front and rear wheels are turned in response to operation of a steering wheel, the rear suspension system comprising:

a wheel support which supports a rear wheel for rotation and is connected to a rear wheel turning rod member of the rear wheel turning mechanism so that the rear wheel on the wheel support is turned about a kingpin axis when the rear wheel turning rod member is displaced, a pair of suspension arms which are connected to the wheel support and guide the wheel support so that it defines the kingpin axis and the rear wheel on the wheel support is turned about the kingpin axis in response to displacement of the rear wheel turning rod member, at least one of the suspension arms comprising a first arm which is connected to the wheel support at one end and to the vehicle body at the other end, and the kingpin axis intersecting the tread of the rear wheel at a point which is offset in the longitudinal direction of the vehicle body from the point at which a side force acts on the rear wheel during cornering, and a damping means which is connected between the first arm and the vehicle body and restrains vertical motion of the rear wheel, the damping means generating a counterforce which urges the wheel support downward relative to the vehicle body by way of the first arm, the first arm being positioned so that the counter force of the damping means, which acts on the wheel support by way of the first arm, generates a moment which tends to turn the rear wheel in the direction opposite to the direction in which the moment, generated by the side force acting on the rear wheel when the vehicle corners with the rear wheel being the outer wheel, tends to turn the rear wheel;

wherein said damping means comprises a spring member which is compressed between the first arm and the vehicle body.

11. A rear suspension system for a four-wheel-steered vehicle which is provided with a front wheel turning mechanism and a rear wheel turning mechanism and in which both front and rear wheels are turned in response to operation of a steering wheel, the rear suspension system comprising:

a wheel support which supports a rear wheel for rotation and is connected to a rear wheel turning rod member of the rear wheel turning mechanism so that the rear wheel on the wheel support is turned about a kingpin axis when the rear wheel turning rod member is displaced, a pair of suspension arms which are connected to the wheel support and guide the wheel support so that it defines the kingpin axis and the rear wheel on the wheel support is turned about the kingpin axis in response to displacement of the rear wheel turning rod member, at least one of the suspension arms comprising a first arm which is connected to the wheel support at one end and to the vehicle body at the other end, and the kingpin axis intersecting the tread of the rear wheel at a point which is offset in the longitudinal direction of the vehicle body from the point at which a side force acts on the rear wheel during cornering, and a damping means which is connected between the first arm and the vehicle body and restrains vertical motion of the rear wheel, the damping means generating a counterforce which urges the wheel support downward relative to the vehicle body by way of the first arm, the first arm being positioned so that the counter force of the damping means, which acts on the wheel support by way of the first arm, generates a moment which tends to turn the rear wheel in the direction opposite to the direction in which the moment, generated by the side force acting on the rear wheel when the vehicle corners with the rear wheel being the outer wheel, tends to turn the rear wheel, wherein the point at which the kingpin axis intersects the tread of the rear wheel is forwardly offset from the point at which a side force acts on the rear wheel during cornering, the kingpin axis tilts inward of the vehicle body at the top, and said first arm is connected to the wheel support in front of the kingpin axis;

and wherein said first arm forms together with a second arm an upper suspension arm which is disposed above the center of the rear wheel.

12. A rear suspension system as defined in claim 11 in which said first arm extends substantially in the transverse direction of the vehicle body.

13. A rear suspension system as defined in claim 12 in which said second arm extends substantially in the longitudinal direction of the vehicle body.

14. A rear suspension system for a four-wheel-steered vehicle which is provided with a front wheel turning mechanism and a rear wheel turning mechanism and in which both front and rear wheels are turned in response to operation of a steering wheel, the rear suspension system comprising:
- a wheel support which supports a rear wheel for rotation and is connected to a rear wheel turning rod member of the rear wheel turning mechanism so that the rear wheel on the wheel support is turned about a kingpin axis when the rear wheel turning rod member is displaced,
- a pair of suspension arms which are connected to the wheel support and guide the wheel support so that it defines the kingpin axis and the rear wheel on the wheel support is turned about the kingpin axis in response to displacement of the rear wheel turning rod member, at least one of the suspension arms comprising a first arm which is connected to the wheel support at one end and to the vehicle body at the other end, and the kingpin axis intersecting the tread of the rear wheel at a point which is offset in the longitudinal direction of the vehicle body from the point at which a side force acts on the rear wheel during cornering, and
- a damping means which is connected between the first arm and the vehicle body and restrains vertical motion of the rear wheel, the damping means generating a counterforce which urges the wheel support downward relative to the vehicle body by way of the first arm,
- the first arm being positioned so that the counter force of the damping means, which acts on the wheel support by way of the first arm, generates a moment which tends to turn the rear wheel in the direction opposite to the direction in which the moment, generated by the side force acting on the rear wheel when the vehicle corners with the rear wheel being the outer wheel, tends to turn the rear wheel,
- wherein the point at which the kingpin axis intersects the tread of the rear wheel is rearwardly offset from the point at which a side force acts on the rear wheel during cornering, the kingpin axis tilts inward of the vehicle body at the top, and said first arm is connected to the wheel support on the rear of the kingpin axis;
- and wherein said first arm forms together with a second arm an upper suspension arm which is disposed above the center of the rear wheel.

15. A rear suspension system as defined in claim 14 in which said first arm extends substantially in the transverse direction of the vehicle body.

16. A rear suspension system as defined in claim 15 in which said second first arm extends substantially in the longitudinal direction of the vehicle body.

* * * * *